United States Patent
Watari

(10) Patent No.: US 6,267,384 B1
(45) Date of Patent: Jul. 31, 2001

(54) THIN 3-PIECE OIL RING

(75) Inventor: Masayuki Watari, Yono (JP)

(73) Assignee: Nippon Piston Ring Co., Ltd., Saitama (JP)

( * ) Notice: Subject to any disclaimer, the term of this patent is extended or adjusted under 35 U.S.C. 154(b) by 0 days.

(21) Appl. No.: 09/248,114

(22) Filed: Feb. 11, 1999

(30) Foreign Application Priority Data

Feb. 25, 1998 (JP) .................................................. 10-043149

(51) Int. Cl.$^7$ ........................................................ F16J 9/06
(52) U.S. Cl. .......................................... 277/473; 277/474
(58) Field of Search ................................... 277/437, 487, 277/489, 494, 496, 497, 546, 468, 473, 474

(56) References Cited

U.S. PATENT DOCUMENTS 4,659,093 * 4/1987 Maeda ................................... 277/437
5,129,661 * 7/1992 Ono et al. ............................. 277/437

FOREIGN PATENT DOCUMENTS 1-52576B2 11/1989 (JP) .

* cited by examiner

*Primary Examiner*—Anthony Knight
*Assistant Examiner*—Enoch Peavey

(57) ABSTRACT

An improved thin 3-piece oil ring 1 of an axial width not greater than 2 mm, is provided that has a corrugated spacer expander 2 of a circumferentially successive, substantially U-shaped configuration, and circular, upper and lower side rails 3, 4 holding the spacer expander 2 therebetween. The spacer expander 2 has circumferentially spaced outer crowns 5 and circumferentially spaced inner crowns 6; each of the outer crowns 5 being connected with next adjacent ones of the inner crowns 6 on opposite sides thereof by a pair of connecting members 11. The spacer expander 2 has both of the most-end portions thereof extended radially outwardly from the most-end one of the inner crowns 6 thereof forming abutting members 15, 16 for abutting each other at the point of force P. The outer crowns 5 at the upper and lower ends thereof have protrusions beyond the axial width of the outer crowns 5 forming upper and lower, outer supporting members 7, 8 bearing against the lower and upper sides of the upper and lower side rails 3, 4, at the outer portion thereof, respectively. The inner crowns 6 at the upper and lower ends thereof have extensions beyond the axial width of the inner crowns 6 forming upper and lower, inner supporting members 9, 10 bearing against the inner edges of the upper and lower side rails 3, 4, respectively. Each connecting member (11) has a radially elongated oil slot 13 made therethrough, and each of the abutting members 15, 16 having a radially elongated guide bar slot (14) made therethrough. The spacer expander 2 has a guide bar 12 inserted through the guide bar slots 14 and a plurality of the oil slots 13, at least one portion of the guide bar 12 being fixed to the spacer expander 2 by caulking. In one aspect of the present invention, the guide bar slots 14 have the axial width thereof made equal to the outer diameter of the guide bar 12. In another aspect of the present invention, the abutting members 15, 16 are such that the point of force P is positioned radially outwardly apart from the inner circumferential surface of the spacer expander 2 by a distance not less than 40% and not more than 60% of the radial width of the spacer expander 2. In a further aspect of the present invention, both of the most-end portions of the abutting members 15, 16 that extend farther radially outwardly beyond the point of force P, are apart from each other making an angle of not less than 5 degrees therebetween. With the arrangement described above, an improved 3-piece oil ring is obtained that has a significantly improved oil-sealing characteristics when used with a piston of internal combustion engines.

3 Claims, 1 Drawing Sheet

THIN 3-PIECE OIL RING

BACKGROUND OF THE INVENTION

1. Field of the Invention

The present invention relates to a thin 3-piece oil ring for internal combustion engines, having a corrugated spacer expander, and upper and lower side rails holding the spacer expander therebetween.

2. Description of the Prior Art

Generally, a 3-piece oil ring for internal combustion engines has a corrugated spacer expander and upper and lower side rails, where the corrugated spacer expander is of a circumferentially successive, substantially U-shaped configuration, including circumferentially spaced outer crowns and inner crowns, with each of the outer crowns connected with next adjacent ones of the inner crowns on opposite sides thereof by a pair of connecting members. The spacer expander has protrusions beyond the axial width of the outer crowns forming upper and lower, outer supporting members bearing against the lower and upper sides of the upper and lower side rails, at the outer portion thereof, respectively, and has extensions beyond the axial width of the inner crowns forming upper and lower, inner supporting members bearing against the inner edges of the upper and lower side rails, respectively. The inner supporting members are bent at a slight angle to the vertical inwardly and upwardly for the upper inner supporting members and inwardly and downwardly for the lower inner supporting members. The end portions of the spacer expander come together and abut each other, referred to as abutting members, enabling compression of the spacer expander when properly installed. Such spacer expander is formed into a generally circular form, initially greater in circumference than it will be when it has been circumferentially compressed and shortened on installation in an engine cylinder.

When such 3-piece oil ring is installed in a piston ring groove of a piston, and the piston with the ring therein within a cylinder of an internal combustion engine, the expansive force of the spacer expander provides a predetermined tension to the upper and lower side rails through the action of inclined inner supporting members If one of the abutting members of the spacer expander overlaps the other abutting member, however, the tension cannot be provided to the upper and lower side rails. To prevent this from occurring, an arrangement is disclosed in Japanese Patent Publication No. 1-52576 (1989), where a guide bar is circumferentially threaded through a plurality of the U-shapes of the spacer expander on both of the opposite sides of the abutment, and the guide bar is fixed to one or more of the U-and-inverted-U shapes.

To enable a thin 3-piece oil ring of a width not greater than 2 mm to exhibit a good oil-sealing characteristics, the radial and axial bearing pressures of the upper and lower side rails are respectively required to be circumferentially uniform. In conventional corrugated spacer expanders, however, it was found that the axial bearing pressure of the side rails generated by the spacer expander in the portion on and around one abutting member was extraordinarily greater than in other portions, and the axial bearing pressure of the side rails in the portion on and around the other abutting member of the spacer expander was extraordinarily smaller than in other portions.

A thorough research on possible causes for this by the present inventors, has revealed that the conventional corrugated spacer expander is apt to cause both of the abutting members at the abutment to be axially displaced and be twisted with each other, which in turn causes the bearing pressure at the inclined supporting members against the upper and lower side rails to be made greater with one side of the abutment and smaller with the other side of the abutment, thereby causing a great discrepancy in the axial bearing pressure between both of the opposite sides of the abutment.

The present invention is made taking the above into consideration, and an object of the present invention is to provide a thin 3-piece oil ring having a corrugated spacer expander of reduced discrepancy in the axial bearing pressure between both of the opposite sides of the abutment.

SUMMARY OF THE INVENTION

In order to accomplish the object described above, in one aspect of the present invention, an improved thin 3-piece oil ring of an axial width not greater than 2 mm, is provided where, advantageously, the guide bar slots have the axial width thereof made equal to the outer diameter of the guide bar, thereby restraining the axial displacement of both of the abutting members with each other.

In another aspect of the present invention, the point of force, where the abutting members abut, is advantageously positioned radially outwardly apart from the inner circumferential surface of the spacer expander by a distance not less than 40% and not more than 60% of the radial width of the spacer expander, thereby restraining the twist around the guide bar of the abutting members on both of the opposite sides with each other, by means of the moment of the frictional force acting at the point of force.

Since the guide bar is located to pass near the inner circumferential surface of the inner crowns of the spacer expander, the farther outwardly apart the point of force is from the inner circumferential surface of the spacer expander, the greater the twist-restraining moment becomes. If the point of force is too far apart, however, the axial bearing pressure there gets greater than in other portions, whereby the position of abutment, or the point of force, is advantageously selected to be not less than 40% and not more than 60% of the axial width of the spacer expander outwardly from the inner circumferential surface of the spacer expander.

With the arrangement described above, a 3-piece oil ring is obtained that has an outstandingly improved oil-sealing characteristics when used with a piston of an internal combustion engines.

Other objects and advantages of the present invention may become more apparent by referring to the following detailed description and accompanying drawings briefly described below.

DESCRIPTION OF THE PREFERRED EMBODIMENTS

Hereunder, the present invention is described more in detail, referring to drawings attached hereto.

Figure 1:
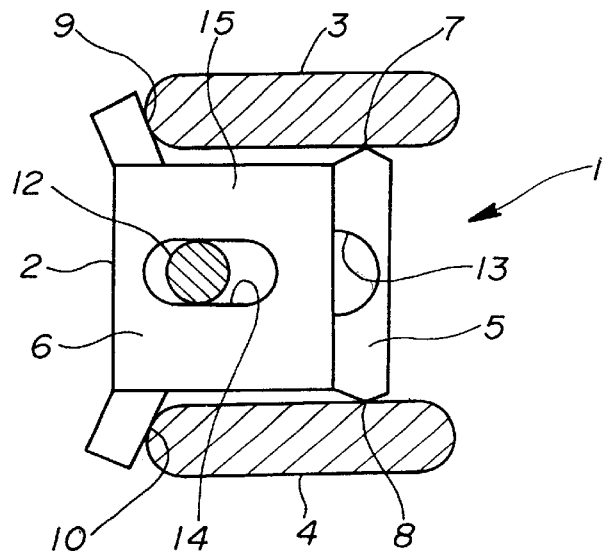
FIG. 1 is an enlarged cross-sectional view of an oil ring according to an embodiment of the present invention.
Figure 2:
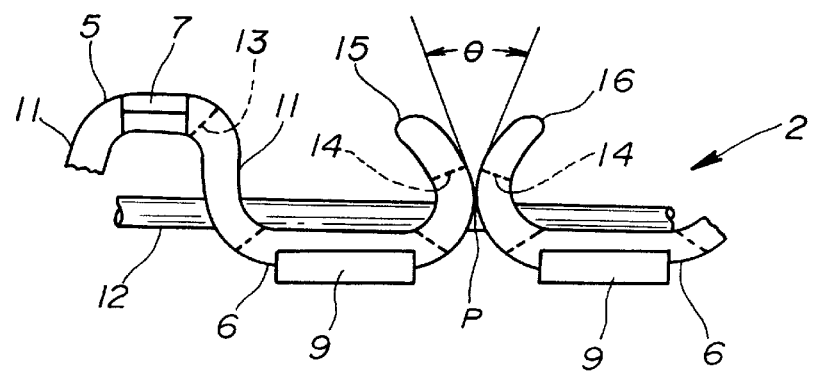
FIG. 2 is a plan view of a main part of the oil ring of FIG. 1, with side rails removed.

FIG. 1 is an enlarged view of a cross-section at the abutment of a thin 3-piece oil ring 1 accordance to an embodiment of the present invention. The overall width of the oil ring in the axial direction, i.e., the vertical direction in the drawing, is not more than 2 mm. FIG. 2 is a plan view of the abutment portion of the spacer expander of the oil ring of FIG. 1, with side rails removed.

The oil ring 1 has a corrugated spacer expander 2 of a circumferentially successive, substantially U-shaped configuration, and circular, upper and lower side rails 3, 4 holding the spacer expander 2 therebetween. The spacer expander 2 has circumferentially spaced outer crowns 5 and circumferentially spaced inner crowns 6. Each of the outer crowns 5 is connected with next adjacent ones of the inner crowns 6 on opposite sides thereof by a pair of connecting members 11. The upper and lower side rails 3, 4 are supported on the lower and upper sides thereof, respectively, by upper and lower, outer supporting members 7, 8 protruding upwardly and downwardly from the outer crowns 5 of the spacer expander 2. The upper and lower side rails 3, 4 are also supported on the lower and upper inner edges thereof, respectively, by upper and lower, inner supporting members 9, 10 extending upwardly and downwardly, respectively, slightly inclined inwardly relative to the vertical from the inner crowns 6 of the spacer expander 2, thereby the expansive force being imparted from the inner supporting members 9, 10 to the side rails 3, 4, in an inclined direction to provide the radial and axial bearing pressures.

Each connecting member 11 has a radially elongated oil slot 13 made therethrough, and each of abutting members 15, 16 having a radially elongated guide bar slot 14 made therethrough.

Figure 3:
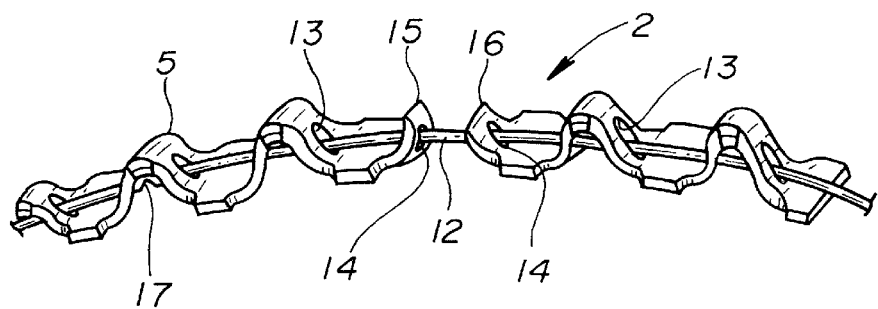
FIG. 3 is a perspective view of a main part of the oil ring of FIG. 1, with the abutment in the open state.

As shown in FIG. 2, the spacer expander 2 has a guide bar 12 inserted through the guide bar slots 14 and the oil slots 13, thereby, as shown in FIG. 3, through at least two pairs each of the connecting members 11 each on both of the opposite sides of the abutment. As also shown in FIG. 3, the guide bar 12 is fixed to the second outer crown 5 from the abutment on one side of the abutment by caulking.

In one aspect of the present invention, advantageously, the guide bar slots 14 have the axial width thereof made equal to the outer diameter of the guide bar 12, while the axial width of the oil slots 13 is equal to or greater than the outer diameter of the guide bar 12.

The abutting members 15, 16 respectively form a convex curve, abutting each other at the point of force. In another aspect of the present invention, the abutting members 15, 16 are advantageously arranged such that the point of force P is positioned radially outwardly apart from the inner circumferential surface of the spacer expander 2 by a distance not less than 40% and not more than 60% of the radial width of the spacer expander 2. Both the most-end portions of the abutting members 15, 16 that extend farther radially outwardly beyond the point of force P, are apart from each other making an angle of θ, as shown in FIG. 2. In a further aspect of the present invention, the angle of θ is advantageously selected to be not less than 5 degrees therebetween, for the purpose of stabilizing the position of the point of force.

Since, as described above, in the spacer expander 2 according to the present invention, the guide bar slots 14 have the axial width thereof made equal to the outer diameter of the guide bar 12, the axial position of the abutting members 15, 16 is defined singly by the guide bar 12, and thereby no axial mutual displacement occurs between the abutting members 15, 16. Thus, discrepancy in the axial bearing pressure between the opposite sides of the abutment due to relative displacement between the opposite sides of the abutment is prevented from occurring.

Furthermore, since the point of force between the abutting members 15, 16 at the abutment is made to be advantageously positioned radially outwardly apart from the inner circumferential surface of the spacer expander 2 by a distance not less than 40% and not more than 60% of the radial width of the spacer expander 2, the moment around the guide bar 12 passing near the inner circumferential surface of the spacer expander 2 causing twist in the abutting members 15, 16, is restrained by the moment caused by the frictional force at the point of force P, whereby discrepancy in the axial bearing pressure between the opposite sides of the abutment due to relative twist between the opposite sides of the abutment is substantially prevented.

In a still further aspect of the present invention, the upper, outer supporting members 7 and inner supporting members 8 of the spacer expander 2, are not flat at their respective upper surfaces and lower surfaces, bearing against the lower side of the upper side rail 3, and the upper side of the lower side rail 4, respectively, like conventional spacer expanders, but advantageously have each an angular-shaped cross section with the angled top thereof bearing against the lower side of the upper side rail 3 and the upper side of the lower side rail 4, respectively. The angled top, or the bearing area, is advantageously positioned slightly radially outwardly from the center of the radial width of the upper and lower, outer supporting members 7, 8, i.e., radially inwardly apart from the outer circumferential surface of the upper and lower, outer supporting members 7, 8 by a distance not less than 40% and not more than 50% of the radial width of the upper and lower, outer supporting members 7, 8. Such angular-shaped cross section with the angled top thereof bearing against the lower and upper sides of the upper and lower side rails 3, 4, respectively, prevents disadvantageous overhang of the side rails 3, 4 from occurring.

Conventional thin 3-piece oil rings had extraordinary discrepancy in the axial bearing pressure between opposite sides of the abutment caused by relative axial displacement and twist between the opposite sides of the abutment.

Unlike such conventional oil rings, as described above, the thin 3-piece oil ring according to the present invention, advantageously prevents the relative axial displacement between the opposite sides of the abutment by having the axial width of the guide bar slots at the abutment made equal to the outer diameter of the guide bar. Furthermore, also unlike such conventional oil rings, the oil ring according to the present invention, advantageously, substantially prevents the relative twist between the opposite sides of the abutment by having the point of force at the abutment positioned radially outwardly apart from the inner circumferential surface of the spacer expander by a distance not less than 40% and not more than 60% of the radial width of the spacer expander, and by restraining the twist-causing moment utilizing the moment of the frictional force.

Therefore, the thin 3-piece oil ring, according to the present invention, has an exceptionally significant advantage in that discrepancy in the axial bearing pressure between the opposite sides of the abutment due to relative displacement and twist between the opposite sides of the abutment is greatly reduced, and thereby the oil-sealing characteristics of the oil ring is significantly improved.

While there have been shown and described fundamental novel features of the invention as applied to a preferred embodiment thereof, it will be understood that various modifications and changes to such embodiments may be made by those skilled in the art without departing from the spirit of the invention. It is our intention, therefore, to be limited only as indicated by the scope of the claims appended hereto.

What is claimed is:

1. An improved thin 3-piece oil ring (1) of an axial width not greater than 2 mm, having a corrugated spacer expander (2) of a circumferentially successive, substantially U-shaped configuration, and circular, upper and lower side rails (3, 4) holding said spacer expander (2) therebetween; said spacer expander (2) having circumferentially spaced outer crowns (5) and circumferentially spaced inner crowns (6); each said outer crown (5) being connected with next adjacent ones of said inner crowns (6) on opposite sides thereof by a pair of connecting members (11); said spacer expander (2) having both of the most-end portions thereof extended radially outwardly from the most-end one of said inner crowns (6) thereof forming abutting members (15, 16) for abutting each other at the point of force (P); said outer crowns (5) at the upper and lower ends thereof having protrusions beyond the axial width of said outer crowns (5) forming upper and lower, outer supporting members (7, 8) bearing against the lower and upper sides of said upper and lower side rails (3, 4), at the outer portion thereof, respectively; said upper and lower, outer supporting members (7, 8) each having an angular-shaped cross section with the angled top thereof bearing against said lower and upper sides of said upper and lower side rails (3, 4), respectively, said angled top being positioned radially inwardly apart from the outer circumferential surface of said upper and lower, outer supporting members (7, 8) by a distance not less than 40% and not more than 50% of the radial width of said upper and lower, outer supporting members (7, 8); said inner crowns (6) at the upper and lower ends thereof having extensions beyond the axial width of said inner crowns (6) forming upper and lower, inner supporting members (9, 10) bearing against the inner edges of said upper and lower side rails (3, 4), respectively; each said connecting member (11) having a radially elongated oil slot (13) made therethrough; each said abutting members (15, 16) having a radially elongated guide bar slot (14) made therethrough; said spacer expander (2) having a guide bar (12) inserted through said guide bar slots (14) and a plurality of said oil slots (13), at least one portion of said guide bar (12) being fixed to said spacer expander (2) by caulking; wherein said guide bar slots (14) have the axial width thereof made equal to the outer diameter of said guide bar (12).

2. An improved thin 3-piece oil ring according to claim 1, wherein:

said abutting members (15, 16) are such that said point of force (P) is positioned radially outwardly apart from the inner circumferential surface of said spacer expander (2) by a distance not less than 40% and not more than 60% of the radial width of said spacer expander (2).

3. The improved thin 3-piece oil ring according to claim 1, wherein:

both of the most-end portions of said abutting members (15, 16) that extend farther radially outwardly beyond said point of force (P), are apart from each other making an angle of not less than 5 degrees therebetween.

* * * * *